US012613444B1

(12) United States Patent
Huang et al.

(10) Patent No.: US 12,613,444 B1
(45) Date of Patent: Apr. 28, 2026

(54) ARRAY SUBSTRATE AND LIQUID CRYSTAL DISPLAY PANEL

(71) Applicant: TCL China Star Optoelectronics Technology Co., Ltd., Shenzhen (CN)

(72) Inventors: Lei Huang, Shenzhen (CN); Liu Yang, Shenzhen (CN); Shumin Tang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 1103 days.

(21) Appl. No.: 17/637,081

(22) PCT Filed: Jan. 17, 2022

(86) PCT No.: PCT/CN2022/072380

§ 371 (c)(1),
(2) Date: Feb. 22, 2022

(87) PCT Pub. No.: WO2023/130501

PCT Pub. Date: Jul. 13, 2023

(30) Foreign Application Priority Data

Jan. 6, 2022 (CN) .......................... 202210009466.2

(51) Int. Cl.
G02F 1/1368 (2006.01)
G02F 1/1362 (2006.01)

(52) U.S. Cl.
CPC ...... G02F 1/1368 (2013.01); G02F 1/136286 (2013.01)

(58) Field of Classification Search
CPC .......................... G02F 1/1368; G02F 1/136286
See application file for complete search history.

(56) References Cited

U.S. PATENT DOCUMENTS

2009/0066232 A1* 3/2009 Koo ................... H10K 59/8722
313/504
2011/0267567 A1 11/2011 Ting et al.

FOREIGN PATENT DOCUMENTS

| CN | 101847640 | 9/2010 |
| CN | 104317126 | 1/2015 |
| CN | 105470205 | 4/2016 |
| CN | 109828395 | 5/2019 |
| CN | 111341793 | 6/2020 |
| CN | 210668376 | 6/2020 |
| CN | 113113425 | 7/2021 |
| CN | 113341623 | 9/2021 |

(Continued)

OTHER PUBLICATIONS

International Search Report and the Written Opinion Dated Oct. 10, 2022 From the China State Intellectual Property Administration Re. Application No. PCT/CN2022/072380. (18 Pages).

(Continued)

*Primary Examiner* — Lucy P Chien

(57) ABSTRACT

The present application provides an array substrate and a liquid crystal display panel. The array substrate and liquid crystal display panel can improve an aperture ratio by providing a first electrode layer, a first active layer, a second electrode layer, a second active layer, and a third electrode layer, and changing an interlayer structure of a thin film transistor, so that different data lines in a pixel structure can be arranged in stacked layers.

15 Claims, 4 Drawing Sheets

(56)  References Cited

FOREIGN PATENT DOCUMENTS

| CN | 214898447 | 11/2021 |
| WO | WO 2016/165183 | 10/2016 |

OTHER PUBLICATIONS

Notification of Office Action and Search Report Dated Jan. 20, 2023
From the State Intellectual Property Office of the People's Republic
of China Re. Application No. 202210009466.2 and Its Translation
Into English. (19 Pages).

* cited by examiner

ARRAY SUBSTRATE AND LIQUID CRYSTAL DISPLAY PANEL

RELATED APPLICATIONS

This application is a National Phase of PCT Patent Application No. PCT/CN2022/072380 having International filing date of Jan. 17, 2022, which claims the benefit of priority of China Patent Application No. 202210009466.2 filed on Jan. 6, 2022. The contents of the above applications are all incorporated by reference as if fully set forth herein in their entirety.

FIELD AND BACKGROUND OF THE INVENTION

The present application relates to a field of display technology and in particular, to an array substrate and a liquid crystal display panel.

Due to a need for larger-sized LCD panels and higher refresh rates, many problems arise, such as undercharging, overload, and mischarging. A pixel structure of conventional LCD panels is changed to solve problems such as undercharging, overload, and mischarging. Accordingly, more data lines need to be arranged. However, having more data lines leads to a decrease in an aperture ratio.

SUMMARY OF THE INVENTION

The present application provides an array substrate and a liquid crystal display (LCD) panel that can have stacked data lines while satisfying a conventional pixel structure, so that an aperture ratio can be increased.

In one aspect, the present application provides an array substrate, comprising:

a base substrate;

a first electrode layer disposed on the base substrate, the first electrode layer comprising a plurality of first sources, a plurality of first drains, and a plurality of first data lines;

a first active layer disposed on the first electrode layer, the first active layer comprising a plurality of first channels, wherein the first sources and the first drains are electrically connected to the first channels;

a first insulating layer disposed on the first active layer;

a second electrode layer disposed on the first insulating layer, the second electrode layer comprising a plurality of gates;

a second insulating layer disposed on the second electrode layer;

a second active layer disposed on the second insulating layer, the second active layer comprising a plurality of second channels; and a third electrode layer disposed on the second active layer, the third electrode layer comprising a plurality of second sources, a plurality of second drains, and a plurality of second data lines, wherein the second sources and the second drains are electrically connected to the second channels.

In the array substrate according to the present application, an orthographic projection of each first data line projected on the base substrate overlaps with an orthographic projection of the corresponding second data line projected on the base substrate.

In the array substrate according to the present application, the array substrate comprises a plurality of sub-pixels arranged in columns, wherein the sub-pixels in the same column are electrically connected to the corresponding first data line and the corresponding second data line.

In the array substrate according to the present application, each sub-pixel is disposed corresponding to one of the first sources, one of the second sources, one of the first drains, one of the second drains, one of the first channels, one of the second channels, and one of the gates.

In the array substrate according to the present application, each sub-pixel comprises a pixel electrode, wherein one of the first source or the first drain is electrically connected to the corresponding first data line, one of the second source or the second drain is electrically connected to the corresponding second data line, the other one of the first source or the first drain is electrically connected to the pixel electrode, and the other one of the second source or the second drain is electrically connected to the pixel electrode.

In the array substrate according to the present application, for each sub-pixel, an orthographic projection of the first source projected on the base substrate overlaps with an orthographic projection of the second source projected on the base substrate; and/or an orthographic projection of the first drain projected on the base substrate overlaps with an orthographic projection of the second drain projected on the base substrate; and/or an orthographic projection of the first channel projected on the base substrate overlaps with an orthographic projection of the second channel projected on the base substrate.

In the array substrate according to the present application, the array substrate comprises a first sub-pixel column and a second sub-pixel column, the first sub-pixel column is disposed adjacent to the second sub-pixel column, one of the first data lines is electrically connected to the first sub-pixel column, and one of the second data lines is electrically connected to the second sub-pixel column.

In the array substrate according to the present application, the array substrate comprises a first sub-pixel and a second sub-pixel, the first sub-pixel and the second sub-pixel are arranged adjacent to each other and disposed in a same column, the first data line is electrically connected to the first sub-pixel, and the second data line is electrically connected to the second sub-pixel.

In the array substrate according to the present application, the first electrode layer further comprises a first lead line and a second lead line, the first lead line and the second lead line are arranged side by side, the first data line is electrically connected to the first lead line, and the second data line is electrically connected to the second lead line through a via hole.

In the array substrate according to the present application, a material of the first electrode layer, the second electrode layer, and the third electrode layer is an alloy consisting of one or both of molybdenum or copper.

In another aspect, the present application provides a liquid crystal display panel, comprising an array substrate, a color filter substrate, and a liquid crystal layer, the array substrate disposed opposite to the color filter substrate, the liquid crystal layer disposed between the array substrate and the color filter substrate, wherein the array substrate comprises:

a base substrate;

a first electrode layer disposed on the base substrate, the first electrode layer comprising a plurality of first sources, a plurality of first drains, and a plurality of first data lines;

a first active layer disposed on the first electrode layer, the first active layer comprising a plurality of first channels, wherein the first sources and the first drains are electrically connected to the first channels;

a first insulating layer disposed on the first active layer;

a second electrode layer disposed on the first insulating layer, the second electrode layer comprising a plurality of gates;

a second insulating layer disposed on the second electrode layer;

a second active layer disposed on the second insulating layer, the second active layer comprising a plurality of second channels; and a third electrode layer disposed on the second active layer, the third electrode layer comprising a plurality of second sources, a plurality of second drains, and a plurality of second data lines, wherein the second sources and the second drains are electrically connected to the second channels.

In the liquid crystal display panel according to the present application, an orthographic projection of each first data line projected on the base substrate overlaps with an orthographic projection of the corresponding second data line projected on the base substrate.

In the liquid crystal display panel according to the present application, the array substrate comprises a plurality of sub-pixels arranged in columns, wherein the sub-pixels in the same column are electrically connected to the corresponding first data line and the corresponding second data line.

In the liquid crystal display panel according to the present application, each sub-pixel is disposed corresponding to one of the first sources, one of the second sources, one of the first drains, one of the second drains, one of the first channels, one of the second channels, and one of the gates.

In the liquid crystal display panel according to the present application, each sub-pixel comprises a pixel electrode, wherein one of the first source or the first drain is electrically connected to the corresponding first data line, one of the second source or the second drain is electrically connected to the corresponding second data line, the other one of the first source or the first drain is electrically connected to the pixel electrode, and the other one of the second source or the second drain is electrically connected to the pixel electrode.

In the liquid crystal display panel according to the present application, for each sub-pixel, an orthographic projection of the first source projected on the base substrate overlaps with an orthographic projection of the second source projected on the base substrate; and/or an orthographic projection of the first drain projected on the base substrate overlaps with an orthographic projection of the second drain projected on the base substrate; and/or an orthographic projection of the first channel projected on the base substrate overlaps with an orthographic projection of the second channel projected on the base substrate.

In the liquid crystal display panel according to the present application, the array substrate comprises a first sub-pixel column and a second sub-pixel column, the first sub-pixel column is disposed adjacent to the second sub-pixel column, one of the first data lines is electrically connected to the first sub-pixel column, and one of the second data lines is electrically connected to the second sub-pixel column.

In the liquid crystal display panel according to the present application, the array substrate comprises a first sub-pixel and a second sub-pixel, the first sub-pixel and the second sub-pixel are arranged adjacent to each other and disposed in a same column, the first data line is electrically connected to the first sub-pixel, and the second data line is electrically connected to the second sub-pixel.

In the liquid crystal display panel according to the present application, the first electrode layer further comprises a first lead line and a second lead line, the first lead line and the second lead line are arranged side by side, the first data line is electrically connected to the first lead line, and the second data line is electrically connected to the second lead line through a via hole.

In the liquid crystal display panel according to the present application, a material of the first electrode layer, the second electrode layer, and the third electrode layer is an alloy consisting of one or both of molybdenum or copper.

Advantages of the Present Application:

The array substrate and the liquid crystal display panel of the present application are provided with the first electrode layer, the first active layer, the second electrode layer, the second active layer, and the third electrode layer. An inter-layer structure of a thin film transistor is changed, so that different data lines in a pixel structure can be stacked in layers, and an aperture ratio can be increased.

BRIEF DESCRIPTION OF THE SEVERAL VIEWS OF THE DRAWINGS

In order to more clearly illustrate the embodiments of the present disclosure or related art, figures which will be described in the embodiments are briefly introduced here-inafter. It is obvious that the drawings are merely for the purposes of illustrating some embodiments of the present disclosure, and a person having ordinary skill in this field can obtain other figures according to these figures without inventive work.

DETAILED DESCRIPTION OF SPECIFIC EMBODIMENTS OF THE INVENTION

The technical solutions of the present application are clearly and completely described below with reference to the accompanying drawings and in conjunction with the embodiments of the present application. Obviously, the described embodiments are only some of the embodiments of the present application, but not all of the embodiments. Based on the embodiments in the present application, all other embodiments obtained by those skilled in the art without creative efforts shall fall within the protection scope of the present application.

In addition, the terms "first", "second", "third", and the like in the description and claims of the present application are used to distinguish different objects, rather than to describe a specific order. The terms "comprising", "having", and any variations thereof are intended to cover non-exclusive inclusion.

Figure 1:
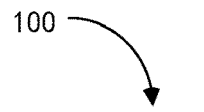
FIG. 1 is a schematic structural view illustrating an array substrate according to one embodiment of the present application.
Figure 1:
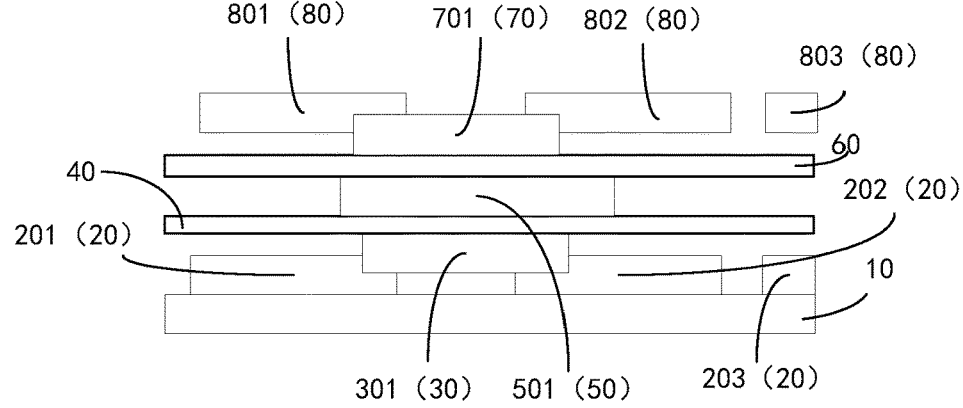

Please refer to FIG. 1, which is a schematic structural view illustrating an array substrate according to one embodiment of the present application. As shown in FIG. 1, the array substrate 100 of the present application comprises a base substrate 10, a first electrode layer 20, a first active layer 30, a first insulating layer 40, a second electrode layer 50, a second insulating layer 60, a second active layer 70, and a third electrode layer 80. The base substrate 10, the first electrode layer 20, the first active layer 30, the first insulating layer 40, the second electrode layer 50, the second insulating layer 60, the second active layer 70, and the third electrode layer 80 are sequentially stacked in layers.

For example, the base substrate 10 has a first surface and a second surface disposed opposite to each other. In one embodiment, the first electrode layer 20, the first active layer 30, the first insulating layer 40, the second electrode layer 50, the second insulating layer 60, the second active layer 70, and the third electrode layer 80 are sequentially stacked on the first surface. In another embodiment, the first electrode layer 20, the first active layer 30, the first insulating layer 40, the second electrode layer 50, the second insulating layer 60, the second active layer 70, and the third electrode layer 80 are sequentially stacked on the second surface.

In the embodiment of the present application, the first electrode layer 20 and the third electrode layer 80 can be used to form sources and drains of thin film transistors. The second electrode layer 50 can be used to form a gate of the thin film transistor. The first active layer 30 and the second active layer 70 can be used to form channels of the thin film transistors.

For example, the base substrate 10 can be a glass base substrate, a polyimide base substrate, or a thin film base substrate. A material of the first electrode layer 20 can be an alloy composed of one or two of molybdenum (Mo) or copper (Cu). A material of the second electrode layer 50 can be an alloy consisting of one or two of molybdenum (Mo) or copper (Cu). A material of the third electrode layer 80 can be an alloy composed of one or two of molybdenum (Mo) or copper (Cu). A material of the first active layer 30 comprises at least one of indium, zinc, or gallium. A material of the second active layer 70 comprises at least one of indium, zinc, or gallium. It should be noted that the material of the first electrode layer 20, the material of the second electrode layer 50, the material of the third electrode layer 80, the material of the first active layer 30, and the material of the second active layer 70 can be selected from appropriate materials according to requirements. The present application is not limited in this regard.

Specifically, the first electrode layer 20 comprises a first source 201, a first drain 202, and a first data line 203. The first active layer 30 comprises a first channel 301. The second electrode layer 50 comprises a gate 501. The second active layer 70 comprises a second channel 701. The third electrode layer 80 comprises a second source 801, a second drain 802, and a second data line 803. Both the first source 201 and the first drain 202 are electrically connected to the first channel 301. Both the second source 801 and the second drain 802 are electrically connected to the second channel 701.

The first electrode layer 20, the first active layer 30, and the second electrode layer 50 can form a thin film transistor structure. That is to say, the first source 201, the first drain 202, the gate 502, and the first channel 301 can form the thin film transistor structure. The second electrode layer 50, the second active layer 70, and the third electrode layer 80 can form a thin film transistor structure. That is to say, the second source 801, the second drain 802, the gate 501, and the second channel 701 can form the thin film transistor structure. It can be understood that, in the embodiment of the present application, two thin film transistor structures can be formed in a direction perpendicular to the base substrate 10.

In the present application, an orthographic projection of the first source 201 projected on the base substrate 10 coincides with an orthographic projection of the second source 801 projected on the base substrate 10, and/or an orthographic projection of the first drain 202 projected on the base substrate 10 coincides with an orthographic projection of the second drain 802 projected on the base substrate 10, and/or an orthographic projection of the first channel 301 projected on the base substrate 10 coincides with an orthographic projection of the second channel 701 projected on the base substrate 10. That is to say, the present application can cause two thin film transistor structures to be stacked in a direction perpendicular to the base substrate 10.

By forming two thin film transistor structures in the direction perpendicular to the base substrate 10, the present application can form the first data line 203 in the first electrode layer 20 and form a second data line 803 in the third electrode layer 80 while also satisfying a conventional pixel structure. On top of that, such a design makes an orthographic projection of the first data line 203 projected on the base substrate 10 coincide with an orthographic projection of the second data line 803 projected on the base substrate (the first data line 203 and the second data line 803 are stacked in the direction perpendicular to the base substrate), so that an aperture ratio can be improved.

Figure 2:
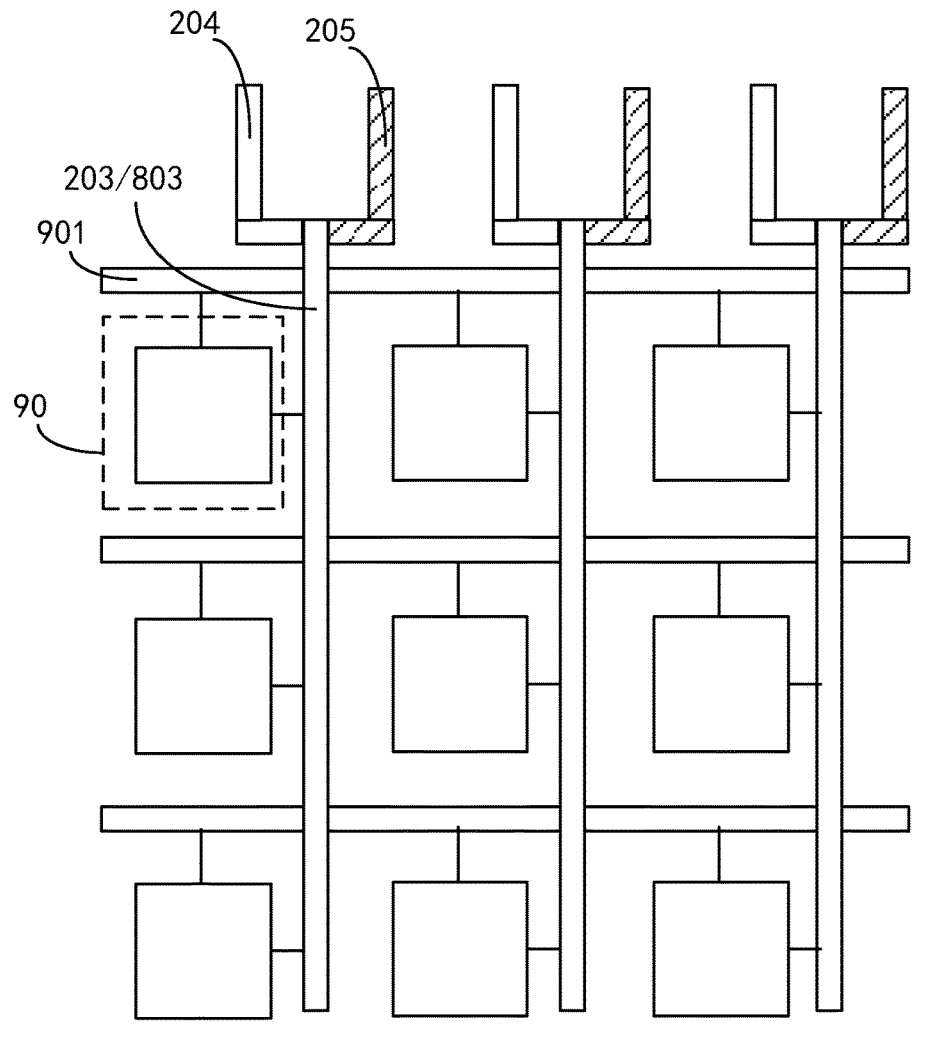
FIG. 2 is a schematic structural view illustrating a pixel structure of the array substrate according to one embodiment of the present application.
Figure 3:
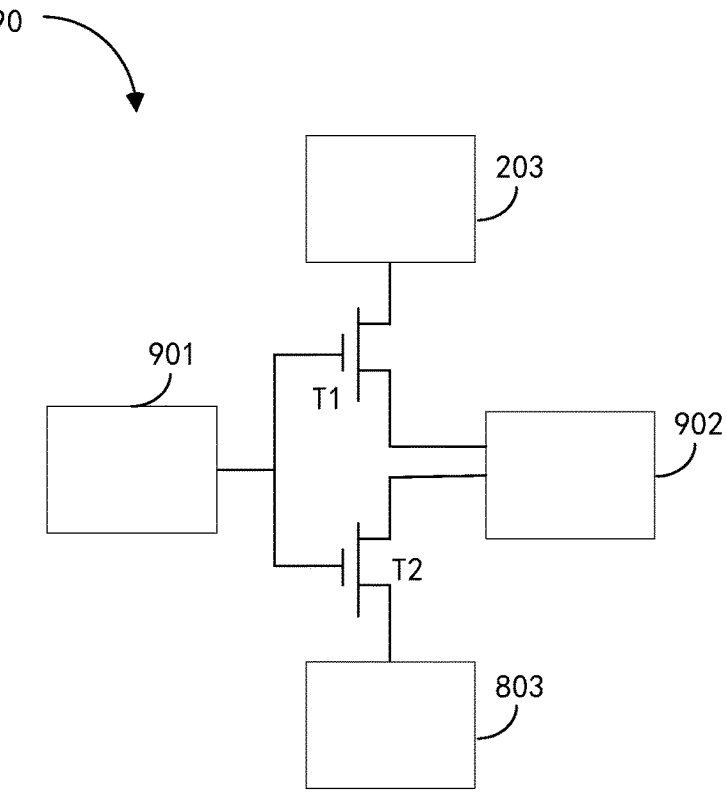
FIG. 3 is a schematic view illustrating an equivalent circuit of a sub-pixel in the pixel structure shown in FIG. 2.

The present application is further described below with reference to a pixel structure. Please refer to FIG. 2 and FIG. 3. FIG. 2 is a schematic structural view of the pixel structure in the array substrate according to one embodiment of the present application. FIG. 3 is a schematic view illustrating an equivalent circuit of the sub-pixel in the pixel structure shown in FIG. 2.

As shown in FIGS. 1, 2, and 3, the pixel structure comprises multiple scan lines 901, multiple first data lines 203, multiple second data lines 803, and multiple sub-pixels 90. The scan lines 901 are arranged along a first direction, and the scan lines 901 expand along a second direction. The first data lines 203 are arranged along the second direction, and the first data lines 203 expand along the first direction. The second data lines 803 are arranged along the second direction, and the second data lines 803 expand along the first direction. The first data lines 203 are disposed in a one-to-one correspondence with the second data lines 803, and an orthographic projection of the first data line 203 projected on the base substrate 10 coincides with an orthographic projection of the second data line 803 projected on the base substrate 10. The sub-pixels 90 are arranged in an array.

Each scan line 901 is electrically connected to each sub-pixel 90 in a corresponding sub-pixel row (i.e., a corresponding row of the sub-pixels), each first data line 203 is electrically connected to each sub-pixel 90 in a corresponding sub-pixel column (a corresponding column of the sub-pixels 90), and each second data line 803 is electrically connected to each sub-pixel 90 in a corresponding sub-pixel column. That is to say, one sub-pixel 90 is electrically connected to one scan line 901, one first data line 203, and one second data line 803.

For example, the sub-pixels 90 in the same column are electrically connected to one first data line 203 and one second data line 803, wherein the first data line 203 and the second data line 803 are stacked in the direction perpendicular to the base substrate 10.

The sub-pixel 90 comprises a first thin film transistor T1, a second thin film transistor T2, and a pixel electrode 902. A gate of the first thin film transistor T1 and a gate of the second thin film transistor T2 are both electrically connected to the scan line 901. One of a source or a drain of the first thin film transistor T1 is electrically connected to the first data line 203, and one of the source or the drain of the first thin film transistor T1 is electrically connected to the pixel electrode 902. One of a source or a drain of the second thin film transistor T2 is electrically connected to the second data line 803, and the other one of the source or the drain of the second thin film transistor T2 is electrically connected to the pixel electrode 902.

It should be noted that the first thin film transistor T1 comprises a first source 201, a first drain 202, a gate 501, and a first channel 301. The second thin film transistor T2 comprises a second source 801, a second drain 802, a gate 501, and a second channel 701.

It can be understood that in the pixel structure, each sub-pixel 90 is correspondingly provided with one first source 201, one second source 801, one first drain 202, one second drain 802, one first channel 301, one second channel 701, and one gate 501. Each sub-pixel 90 comprises one pixel electrode 902. One of the first source 201 or the first drain 202 is electrically connected to the first data line 203, one of the second source 801 or the second drain 802 is electrically connected to the second data line 803, the other one of the first source 201 or the first drain 202 is electrically connected to the pixel electrode 902, and the other one of the second source 801 or the second drain 802 is electrically connected to the pixel electrode 902.

Further, the first electrode layer 20 further comprises a first lead line 204 and a second lead line 205. The first lead line 204 and the second lead line 205 are arranged side by side. The first data line 203 is electrically connected to the first lead line 204. The second data line 803 is electrically connected to the second lead line 205 through a via hole.

Based on this pixel structure, the present application changes an interlayer structure of the thin film transistor by arranging the first electrode layer 20, the first active layer 30, the second electrode layer 50, the second active layer 70, and the third electrode layer 80, so that the first data line 203 and the second data line 803 connected to the sub-pixels 90 in the same column can be stacked in the direction perpendicular to the base substrate 10. As a result, an aperture ratio can be increased.

Figure 4:
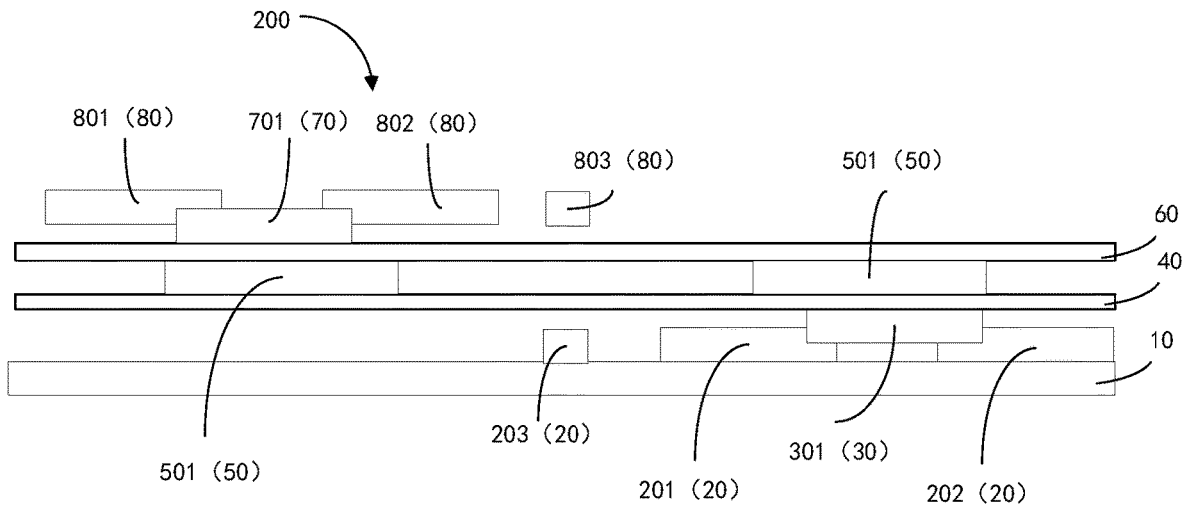
FIG. 4 is another schematic structural view of the array substrate according to one embodiment of the present application.

Please refer to FIG. 4, which is another schematic structural view illustrating an array substrate according to one embodiment of the present application. The array substrate 200 shown in FIG. 4 is different from the array substrate 100 shown in FIG. 1 in the following. In the array substrate 100 shown in FIG. 1, the orthographic projections of the two transistor structures formed on the base substrate 10 in the direction perpendicular to the base substrate 10 at least partially overlap each other. In the array substrate 200 shown in FIG. 4, the orthographic projections of the two transistor structures formed on the base substrate 10 in the direction perpendicular to the base substrate 10 do not overlap each other.

Specifically, referring to FIG. 4, the array substrate 200 according to one embodiment of the present application comprises a base substrate 10, a first electrode layer 20, a first active layer 30, a first insulating layer 40, a second electrode layer 50, a second insulating layer 60, a second active layer 70, and a third electrode layer 80. The base substrate 10, the first electrode layer 20, the first active layer 30, the first insulating layer 40, the second electrode layer 50, the second insulating layer 60, the second active layer 70, and the third electrode layer 80 are sequentially stacked.

For example, the base substrate 10 has a first surface and a second surface disposed opposite to each other. In one embodiment, the first electrode layer 20, the first active layer 30, the first insulating layer 40, the second electrode layer 50, the second insulating layer 60, the second active layer 70, and the third electrode layer 80 are sequentially stacked on the first surface. In another embodiment, the first electrode layer 20, the first active layer 30, the first insulating layer 40, the second electrode layer 50, the second insulating layer 60, the second active layer 70, and the third electrode layer 80 are sequentially stacked on the second surface.

In the present application, the first electrode layer 20 and the third electrode layer 80 can be used to form sources of thin film transistors and drain of the thin film transistors. The second electrode layer 50 can be used to form a gate of the thin film transistor. The first active layer 30 and the second active layer 70 can be used to form channels of the thin film transistors. It should be noted that a material of the first electrode layer 20, a material of the second electrode layer 50, a material of the third electrode layer 80, a material of the first active layer 30, and a material of the second active layer 70 can be selected from appropriate materials according to requirements. The present application is not limited in this regard.

Specifically, the first electrode layer 20 comprises a first source 201, a first drain 202, and a first data line 203. The first active layer 30 comprises a first channel 301. The second electrode layer 50 comprises a gate 501. The second active layer 70 comprises a second channel 701. The third electrode layer 80 comprises a second source 801, a second drain 802, and a second data line 803. Both the first source 201 and the first drain 202 are electrically connected to the first channel 301. Both the second source 801 and the second drain 802 are electrically connected to the second channel 701.

The first electrode layer 20, the first active layer 30, and the second electrode layer 50 can form a thin film transistor structure. That is to say, the first source 201, the first drain 202, the gate 502, and the first channel 301 can form the thin film transistor structure. The second electrode layer 50, the second active layer 70, and the third electrode layer 80 can form a thin film transistor structure. That is to say, the second source 801, the second drain 802, the gate 501, and the second channel 701 can form the thin film transistor structure. It can be understood that, in the embodiment of the present application, two thin film transistor structures can be formed in a direction perpendicular to the base substrate 10.

In the present application, an orthographic projection of the first source 201 projected on the base substrate 10 does not coincide with an orthographic projection of the second source 801 projected on the base substrate 10. An orthographic projection of the first drain 202 projected on the base substrate 10 does not coincide with an orthographic projection of the second drain 802 projected on the base substrate 10. An orthographic projection of the first channel 301 projected on the base substrate 10 does not coincide with an orthographic projection of the second channel 701 projected on the base substrate 10. That is to say, in the present embodiment, the two transistor structures can be staggered in the direction perpendicular to the base substrate 10.

By forming two thin film transistor structures in the direction perpendicular to the base substrate 10, the present application can form the first data line 203 in the first electrode layer 20 and form a second data line 803 in the third electrode layer 80 while also satisfying a conventional pixel structure. On top of that, such a design makes an orthographic projection of the first data line 203 projected on the base substrate 10 coincide with an orthographic projection of the second data line 803 projected on the base substrate (the first data line 203 and the second data line 803 are stacked in the direction perpendicular to the base substrate), so that an aperture ratio can be improved.

Figures 5, 6:
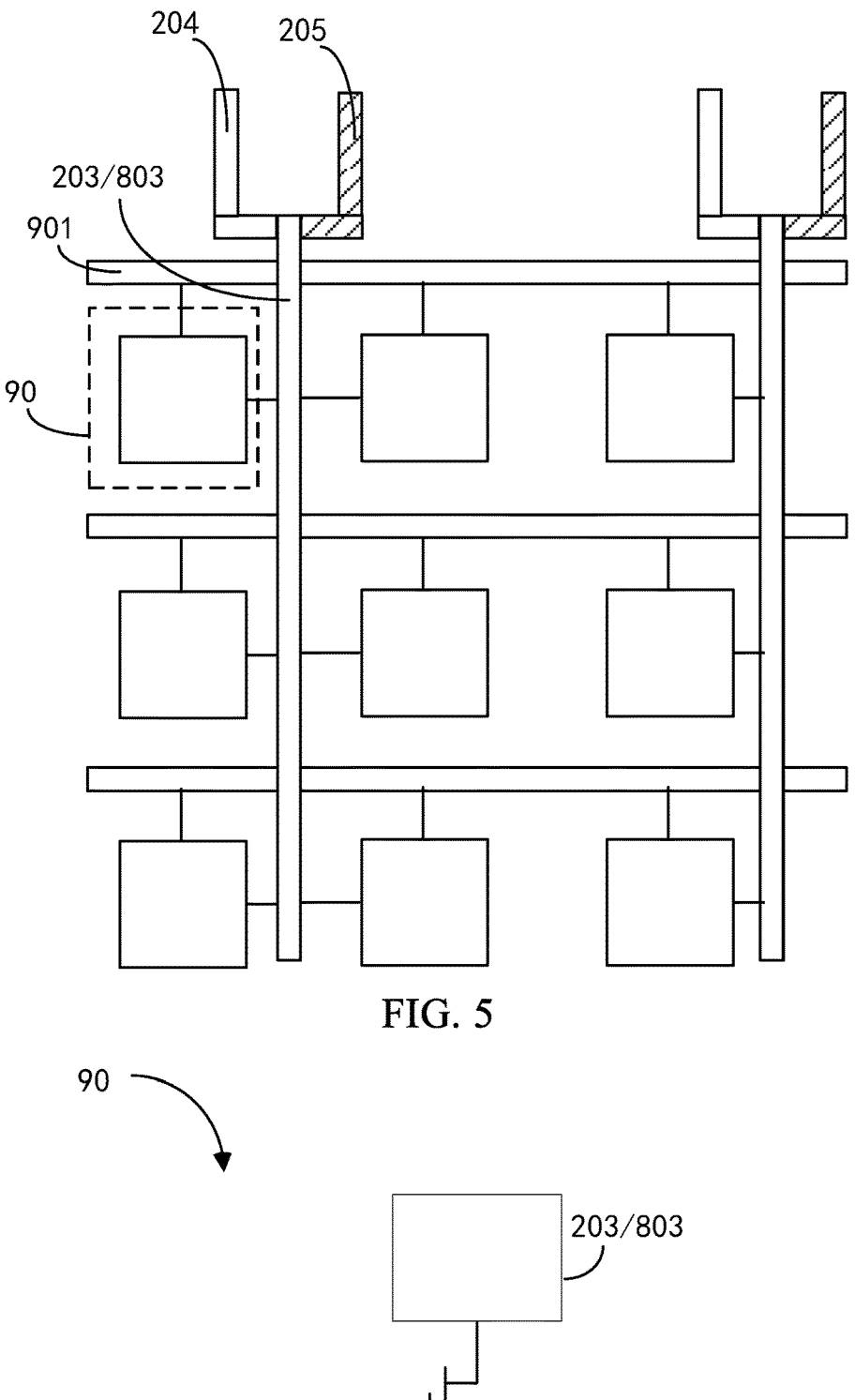
FIG. 5 is another schematic structural view illustrating the pixel structure in the array substrate according to one embodiment of the present application.
FIG. 6 is a schematic view illustrating an equivalent circuit of the sub-pixel in the pixel structure shown in FIG. 5.

The present application is further described below with reference to a pixel structure. Please refer to FIG. 5 and FIG. 6. FIG. 5 is another schematic structural view illustrating the pixel structure in the array substrate according to one embodiment of the present application. FIG. 6 is a schematic view illustrating an equivalent circuit of the sub-pixel in the pixel structure shown in FIG. 5.

As shown in FIGS. 4, 5, and 6, the pixel structure comprises multiple scan lines 901, multiple first data lines 203, multiple second data lines 803, and multiple sub-pixels 90. The scan lines 901 are arranged along a first direction, and the scan lines 901 expand along a second direction. The first data lines 203 are arranged along the second direction, and the first data lines 203 expand along the first direction. The second data lines 803 are arranged along the second direction, and the second data lines 803 expand along the first direction. The first data lines 203 are disposed in a one-to-one correspondence with the second data lines 803, and an orthographic projection of the first data line 203 projected on the base substrate 10 coincides with an orthographic projection of the second data line 803 projected on the base substrate 10. The sub-pixels 90 are arranged in an array.

Each scan line 901 is electrically connected to each sub-pixel 90 in a corresponding sub-pixel row, each first data line 203 is electrically connected to each sub-pixel 90 in a corresponding first sub-pixel column, and each second data line 803 is electrically connected to a corresponding second sub-pixel column. The first sub-pixel column is disposed adjacent to the second sub-pixel column. That is to say, one sub-pixel 90 in the first sub-pixel column is electrically connected to one scan line 901 and one first data line 203. One sub-pixel 90 in the second sub-pixel column is electrically connected to one scan line 901 and one second data line 803.

The sub-pixel 90 in the first sub-pixel column comprises a first thin film transistor T1 and a pixel electrode 902. A gate of the first thin film transistor T1 is electrically connected to the scan line 901. One of the source or the drain of the first thin film transistor T1 is electrically connected to the first data line 203, and one of the source or the drain of the first thin film transistor T1 is electrically connected to the pixel electrode 902. The sub-pixel 90 in the second sub-pixel column comprises a second thin film transistor T2 and a pixel electrode 902. A gate of the second thin film transistor T2 is electrically connected to the scan line 901. One of the source or the drain of the second thin film transistor T2 is electrically connected to the second data line 803, and one of the source or the drain of the second thin film transistor T2 is electrically connected to the pixel electrode 902.

It should be noted that the first thin film transistor T1 comprises one first source 201, one first drain 202, one gate

501, and one first channel 301. The second thin film transistor T2 comprises one second source 801, one second drain 802, one gate 501, and one second channel 701.

It can be understood that in this pixel structure, each sub-pixel 90 in the first sub-pixel column is correspondingly provided with one first source 201, one first drain 202, one first channel 301, and one gate 501. Each sub-pixel 90 in the second sub-pixel column is correspondingly provided with one second source 801, one second drain 802, one second channel 701, and one gate 501. Each sub-pixel 90 comprises one pixel electrode 902.

Further, the first electrode layer 20 further comprises a first lead line 204 and a second lead line 205. The first lead line 204 and the second lead line 205 are arranged side by side. The first data line 203 is electrically connected to the first lead line 204. The second data line 803 is electrically connected to the second lead line 205 through a via hole.

Based on this pixel structure, the present application changes an interlayer structure of the thin film transistor by arranging the first electrode layer 20, the first active layer 30, the second electrode layer 50, the second active layer 70, and the third electrode layer 80, so that the first data line 203 connected to the sub-pixels 90 in the first sub-pixel column and the second data line 803 connected to the sub-pixels 90 in the second sub-pixel column can be stacked in the direction perpendicular to the base substrate 10. As a result, an aperture ratio can be increased.

Figure 7:
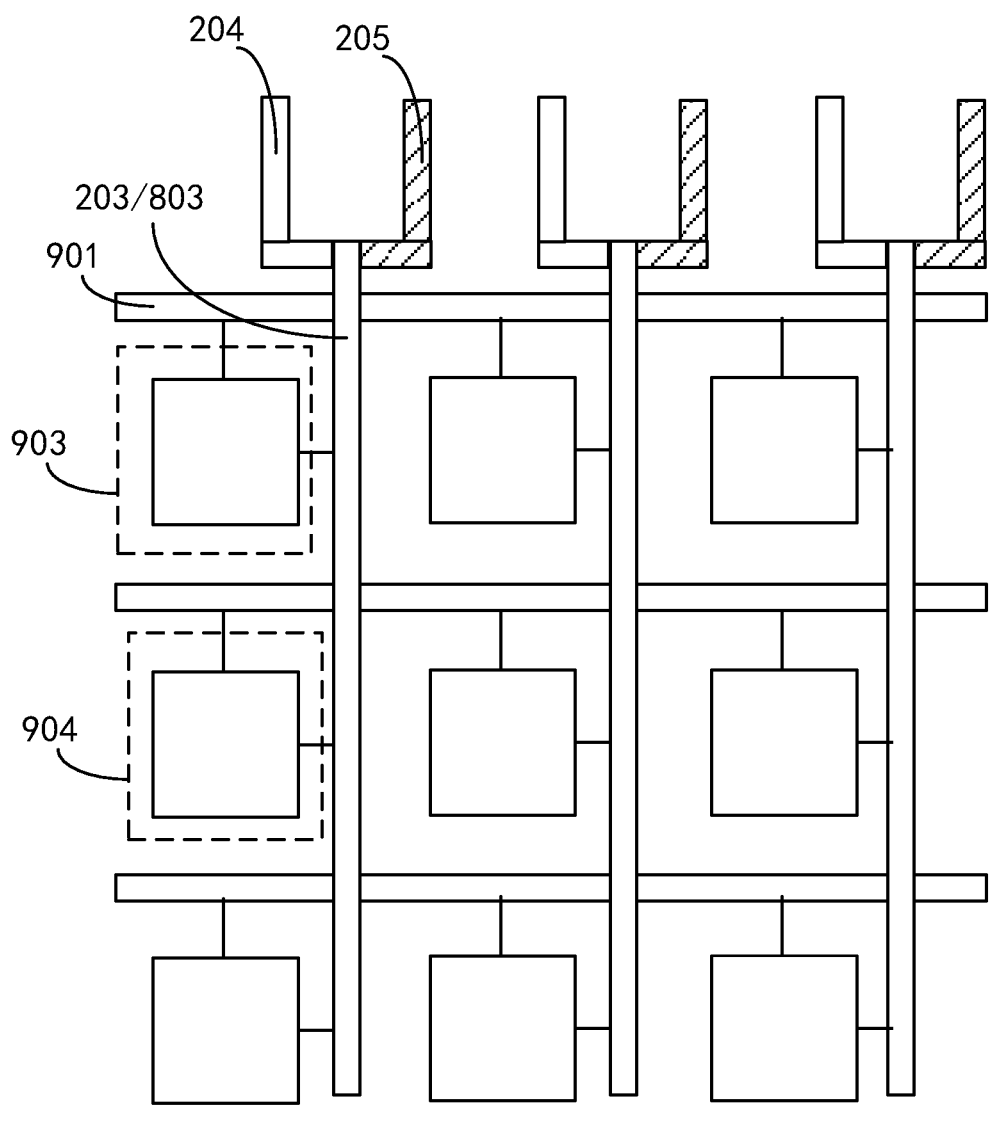
FIG. 7 is still another schematic structural view illustrating the pixel structure in the array substrate according to one embodiment of the present application.

Please refer to FIG. 7. FIG. 7 is still another schematic structural view of a pixel structure of the array substrate according to one embodiment of the present application. The pixel structure shown in FIG. 7 is different from the pixel structure shown in FIG. 5 in the following. The pixel structure shown in FIG. 7 comprises a first sub-pixel 903 and a second sub-pixel 904. The first sub-pixel 903 and the second sub-pixel 904 are arranged adjacently and in the same column. The first data line 203 is electrically connected to the first sub-pixel 903, and the second data line 803 is electrically connected to the second sub-pixel 904.

Referring to FIGS. 4, 6, and 7, the pixel structure comprises multiple scan lines 901, multiple first data lines 203, multiple second data lines 803, multiple first sub-pixels 903, and multiple second sub-pixels 904. The scan lines 901 are arranged along a first direction, and the scan lines 901 expand along a second direction. The first data lines 203 are arranged along the second direction, and the first data lines 203 expand along the first direction. The second data lines 803 are arranged along the second direction, and the second data lines 803 expand along the first direction. The first data lines 203 are disposed in a one-to-one correspondence with the second data lines 803. An orthographic projection of the first data line 203 projected on the base substrate 10 coincides with an orthographic projection of the second data lines 803 disposed corresponding to the first data lines 203 projected on the base substrate 10. The first sub-pixels 903 and the second sub-pixels 904 are arranged in an array pattern.

Each scan line 901 is electrically connected to each first sub-pixel 903 or each second sub-pixel 904 in a corresponding sub-pixel row. Each first data line 203 is electrically connected to each first sub-pixel 903 in a corresponding sub-pixel column. Each second data line 803 is electrically connected to each second sub-pixel 904 in a corresponding sub-pixel column. The first sub-pixel 903 and the second sub-pixel 904 are disposed adjacent to each other and are located in the same column. That is to say, the first sub-pixel 903 in the sub-pixel column are electrically connected to one scan line 901 and one first data line 203. The second sub-pixels 904 in the sub-pixel column are electrically connected to one scan line 901 and one second data line 803.

The first sub-pixel 903 comprises the first thin film transistor T1 and the pixel electrode 902. The gate of the first thin film transistor T1 is electrically connected to the scan line 901. One of the source or the drain of the first thin film transistor T1 is electrically connected to the first data line 203, and one of the source or the drain of the first thin film transistor T1 is electrically connected to the pixel electrode 902. The second sub-pixel 904 comprises the second thin film transistor T2 and the pixel electrode 902. The gate of the second thin film transistor T2 is electrically connected to the scan line 901. One of the source or the drain of the second thin film transistor T2 is electrically connected to the second data line 803, and one of the source or the drain of the second thin film transistor T2 is electrically connected to the pixel electrode 902.

It should be noted that the first thin film transistor T1 comprises one first source 201, one first drain 202, one gate 501, and one first channel 301. The second thin film transistor T2 comprises one second source 801, one second drain 802, one gate 501, and one second channel 701.

It can be understood that in this pixel structure, each first sub-pixel 903 in the sub-pixel column is correspondingly provided with one first source 201, one first drain 202, one first channel 301, and one gate 501. Each second sub-pixel 904 in the sub-pixel column is provided with one second source 801, one second drain 802, one second channel 701, and one gate 501. Each of the first sub-pixels 903 and each of the second sub-pixels 904 both comprise one pixel electrode 902.

Further, the first electrode layer 20 further comprises a first lead line 204 and a second lead line 205. The first lead line 204 and the second lead line 205 are arranged side by side. The first data line 203 is electrically connected to the first lead line 204. The second data line 803 is electrically connected to the second lead line 205 through a via hole.

Based on this pixel structure, the present application changes an interlayer structure of the thin film transistor by arranging the first electrode layer 20, the first active layer 30, the second electrode layer 50, the second active layer 70, and the third electrode layer 80, so that the first data line 203 connected to the first sub-pixels 903 in the sub-pixel column and the second data line 803 connected to the second sub-pixels 904 in the sub-pixel column can be stacked in the direction perpendicular to the base substrate 10. As a result, an aperture ratio can be increased.

Figure 8:
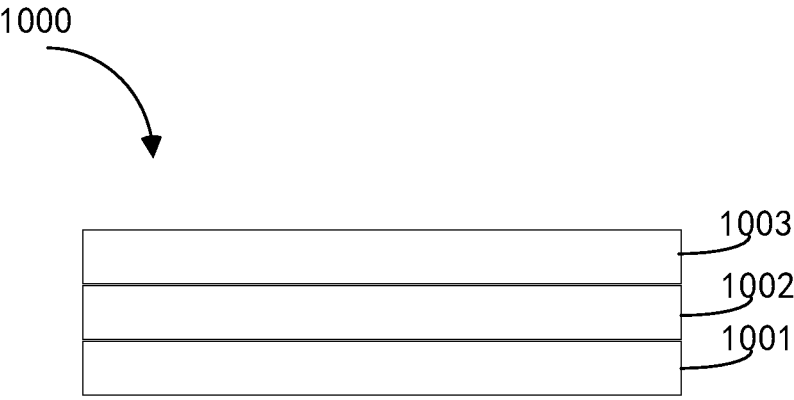
FIG. 8 is a schematic structural view illustrating a liquid crystal display panel according to one embodiment of the present application.

Please refer to FIG. 8, which is a schematic structural view of a liquid crystal display panel according to one embodiment of the present application. As shown in FIG. 8, the liquid crystal display panel 1000 of the present application comprises an array substrate 1001, a color filter substrate 1003, and a liquid crystal layer 1002. The array substrate 1001 and the color filter substrate 1003 are disposed opposite to each other, and the liquid crystal layer 1002 is disposed between the array substrate 1001 and the color filter substrate 1003. The array substrate 1001 comprises the array substrate described above.

The liquid crystal display panel of the present application is provided with a first electrode layer, a first active layer, a second electrode layer, a second active layer, and a third electrode layer. By changing the interlayer structure of the thin film transistor, different data lines in a pixel structure can be stacked in layers, so an aperture ratio can be increased.

The array substrate and the liquid crystal display panel of the present application are introduced in detail above. The working principles and embodiments of the present application are described with specific examples. According to the ideas of the application, those skilled in the art can change or modify the specific embodiments and protection scope. In summary, the content of this specification should not be construed as a limitation to the present application.

What is claimed is:

1. An array substrate, comprising:
a base substrate;
a first electrode layer disposed on the base substrate, the first electrode layer comprising a plurality of first sources, a plurality of first drains, and a plurality of first data lines;
a first active layer disposed on the first electrode layer, the first active layer comprising a plurality of first channels, wherein the first sources and the first drains are electrically connected to the first channels;
a first insulating layer disposed on the first active layer;
a second electrode layer disposed on the first insulating layer, the second electrode layer comprising a plurality of gates;
a second insulating layer disposed on the second electrode layer;
a second active layer disposed on the second insulating layer, the second active layer comprising a plurality of second channels;
a third electrode layer disposed on the second active layer, the third electrode layer comprising a plurality of second sources, a plurality of second drains, and a plurality of second data lines, wherein the second sources and the second drains are electrically connected to the second channels; and
a plurality of sub-pixels arranged in an array,
wherein each second data line is stacked above one of the first data lines, the first data lines and the second data lines extend in a column direction, and an orthographic projection of each first data line projected on the base substrate overlaps with an orthographic projection of the corresponding second data line projected on the base substrate;
wherein each sub-pixel in a same column is electrically connected to a pair of the first data lines and the second data lines stacked on each other, and each pair of the first data lines and the second data lines stacked on each other.

2. The array substrate according to claim 1, wherein each sub-pixel is disposed corresponding to one of the first sources, one of the second sources, one of the first drains, one of the second drains, one of the first channels, one of the second channels, and one of the gates.

3. The array substrate according to claim 2, wherein each sub-pixel comprises a pixel electrode, wherein one of the first source and the first drain is electrically connected to the corresponding first data line, one of the second source and the second drain is electrically connected to the corresponding second data line, the other one of the first source and the first drain is electrically connected to the pixel electrode, and the other one of the second source and the second drain is electrically connected to the pixel electrode.

4. The array substrate according to claim 3, wherein for each sub-pixel, an orthographic projection of the first source projected on the base substrate overlaps with an orthographic projection of the second source projected on the base substrate; and/or an orthographic projection of the first drain projected on the base substrate overlaps with an orthographic projection of the second drain projected on the base substrate; and/or an orthographic projection of the first channel projected on the base substrate overlaps with an orthographic projection of the second channel projected on the base substrate.

5. The array substrate according to claim 1, wherein the first electrode layer further comprises a first lead line and a second lead line, the first lead line and the second lead line are arranged side by side, the first data line is electrically connected to the first lead line, and the second data line is electrically connected to the second lead line through a via hole.

6. The array substrate according to claim 1, wherein a material of the first electrode layer, the second electrode layer, and the third electrode layer is an alloy consisting of one or both of molybdenum or copper.

7. A liquid crystal display panel, comprising an array substrate, a color filter substrate, and a liquid crystal layer, the array substrate disposed opposite to the color filter substrate, the liquid crystal layer disposed between the array substrate and the color filter substrate, wherein the array substrate comprises:

a base substrate;

a first electrode layer disposed on the base substrate, the first electrode layer comprising a plurality of first sources, a plurality of first drains, and a plurality of first data lines;

a first active layer disposed on the first electrode layer, the first active layer comprising a plurality of first channels, wherein the first sources and the first drains are electrically connected to the first channels;

a first insulating layer disposed on the first active layer;

a second electrode layer disposed on the first insulating layer, the second electrode layer comprising a plurality of gates;

a second insulating layer disposed on the second electrode layer;

a second active layer disposed on the second insulating layer, the second active layer comprising a plurality of second channels;

a third electrode layer disposed on the second active layer, the third electrode layer comprising a plurality of second sources, a plurality of second drains, and a plurality of second data lines, wherein the second sources and the second drains are electrically connected to the second channels; and a plurality of sub-pixels arranged in an array, wherein each second data line is stacked above one of the first data lines, the first data lines and the second data lines extend in a column direction, and an orthographic projection of each first data line projected on the base substrate overlaps with an orthographic projection of the corresponding second data line projected on the base substrate;

wherein each sub-pixel in a same column is electrically connected to a pair of the first data lines and the second data lines stacked on each other, and each pair of the first data lines and the second data lines stacked on each other.

8. The liquid crystal display panel according to claim 7, wherein each sub-pixel is disposed corresponding to one of the first sources, one of the second sources, one of the first drains, one of the second drains, one of the first channels, one of the second channels, and one of the gates.

9. The liquid crystal display panel according to claim 8, wherein each sub-pixel comprises a pixel electrode, wherein one of the first source and the first drain is electrically connected to the corresponding first data line, one of the second source and the second drain is electrically connected to the corresponding second data line, the other one of the first source and the first drain is electrically connected to the pixel electrode, and the other one of the second source and the second drain is electrically connected to the pixel electrode.

10. The liquid crystal display panel according to claim 9, wherein for each sub-pixel, an orthographic projection of the first source projected on the base substrate overlaps with an orthographic projection of the second source projected on the base substrate; and/or an orthographic projection of the first drain projected on the base substrate overlaps with an orthographic projection of the second drain projected on the base substrate; and/or an orthographic projection of the first channel projected on the base substrate overlaps with an orthographic projection of the second channel projected on the base substrate.

11. The liquid crystal display panel according to claim 7, wherein the first electrode layer further comprises a first lead line and a second lead line, the first lead line and the second lead line are arranged side by side, the first data line is electrically connected to the first lead line, and the second data line is electrically connected to the second lead line through a via hole.

12. The liquid crystal display panel according to claim 7, wherein a material of the first electrode layer, the second electrode layer, and the third electrode layer is an alloy consisting of one or both of molybdenum or copper.

13. An array substrate, comprising:

a base substrate;

a first electrode layer disposed on the base substrate, the first electrode layer comprising a plurality of first sources, a plurality of first drains, and a plurality of first data lines;

a first active layer disposed on the first electrode layer, the first active layer comprising a plurality of first channels, wherein the first sources and the first drains are electrically connected to the first channels;

a first insulating layer disposed on the first active layer;

a second electrode layer disposed on the first insulating layer, the second electrode layer comprising a plurality of gates;

a second insulating layer disposed on the second electrode layer;

a second active layer disposed on the second insulating layer, the second active layer comprising a plurality of second channels;

a third electrode layer disposed on the second active layer, the third electrode layer comprising a plurality of second sources, a plurality of second drains, and a plurality of second data lines, wherein the second sources and the second drains are electrically connected to the second channels; and a plurality of sub-pixels arranged in an array, wherein each second data line is stacked above one of the first data lines, the first data lines and the second data lines extend in a column direction, and an orthographic projection of each first data line projected on the base substrate overlaps with an orthographic projection of the corresponding second data line projected on the base substrate;

wherein the array substrate comprises a first sub-pixel column and a second sub-pixel column, the first sub-pixel column is disposed adjacent to the second sub-pixel column, one of the first data lines is electrically connected to the first sub-pixel column, and one of the second data lines is electrically connected to the second sub-pixel column.

14. The array substrate according to claim 13, wherein the first electrode layer further comprises a first lead line and a second lead line, the first lead line and the second lead line are arranged side by side, the first data line is electrically connected to the first lead line, and the second data line is electrically connected to the second lead line through a via hole.

15. The array substrate according to claim 13, wherein a material of the first electrode layer, the second electrode layer, and the third electrode layer is an alloy consisting of one or both of molybdenum or copper.

\* \* \* \* \*